Figure 1:
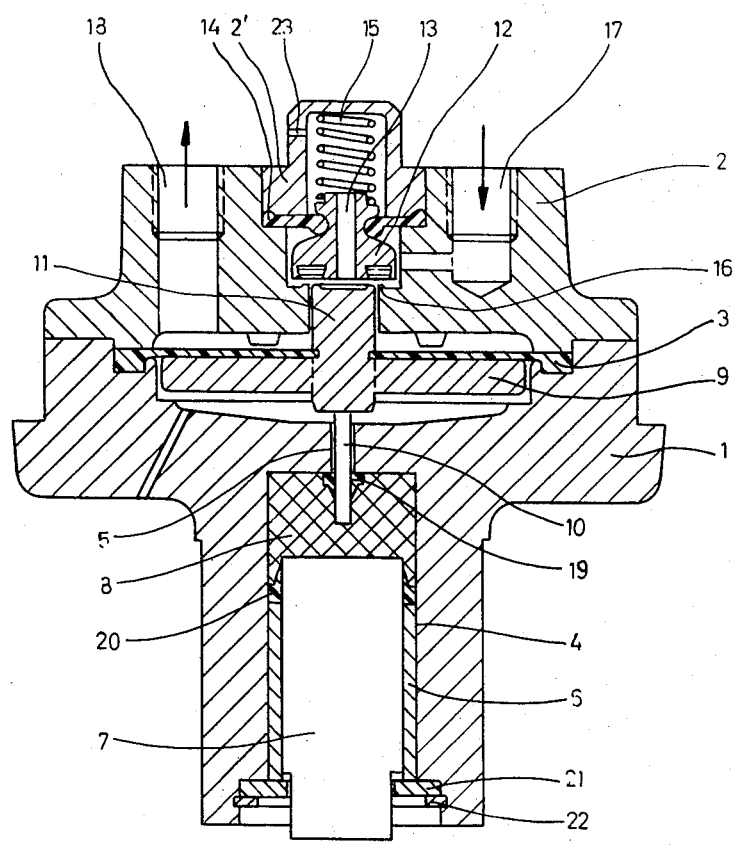

United States Patent [19]
Persson et al.

[11] 3,808,954
[45] May 7, 1974

[54] FORCE TRANSMITTING DEVICE OF A WEIGHING VALVE FOR A VEHICLE

[75] Inventors: Gert Artur Persson, Oxie; Lars Mattis Severinsson, Malmo, both of Sweden

[73] Assignee: Svenska Aktiebolaget Bromsregulator, Malmo, Sweden

[22] Filed: Mar. 24, 1972

[21] Appl. No.: 237,764

[30] Foreign Application Priority Data
Apr. 7, 1971   Great Britain................... 9004/71
Dec. 4, 1971   Great Britain................. 56416/71

[52] U.S. Cl................... 92/65, 60/54.5 R, 92/84, 251/57
[51] Int. Cl......................................... F01b 7/10
[58] Field of Search......... 60/54.5 R; 92/61, 65, 84; 251/57

[56] References Cited
UNITED STATES PATENTS

| | | | |
|---|---|---|---|
| 3,712,053 | 1/1973 | Kefink | 60/23 |
| 2,197,012 | 4/1940 | Sauzedde | 92/61 X |
| 2,917,269 | 12/1959 | Welker | 251/57 X |
| 3,165,895 | 1/1965 | Riley | 60/54.5 R |
| 3,304,870 | 2/1967 | Growall et al. | 60/54.5 R X |
| 3,336,745 | 8/1967 | Schwartz | 60/54.5 R X |

FOREIGN PATENTS OR APPLICATIONS

| | | | |
|---|---|---|---|
| 856,725 | 12/1960 | Great Britain | 60/54.5 |
| 971,886 | 3/1961 | Great Britain | 92/84 |
| 809,455 | 3/1955 | Great Britain | 60/54.5 R |
| 971,886 | 3/1961 | Great Britain | 92/84 |

*Primary Examiner*—Edgar W. Geoghegan
*Assistant Examiner*—Abraham Hershkovitz
*Attorney, Agent, or Firm*—Laurence R. Brown, Esq.

[57] ABSTRACT

A weighing valve mounted on a vehicle to produce a fluid having a pressure proportional to the load of the vehicle is activated by a force translating device which produces a proportionate force to the valve to thereby generate fluid flow changes of pressure signalling the loading on the vehicle. The force translating device has a differential piston with a plunger of smaller diameter for actuating the valve communicating with a plunger of larger diameter responsive to the load. The plunger and piston are interconnected through a deformable, incompressible medium such as silicone rubber into which both the end and sides of the smaller diameter plunger are extended thereby dampening vibrations.

7 Claims, 2 Drawing Figures

FORCE TRANSMITTING DEVICE OF A WEIGHING VALVE FOR A VEHICLE

This invention relates to a force transmitting device of a weighing valve intended for mounting in the underframe of a vehicle and besides the said device including a valve-part influenced thereof for emitting a pressurized fluid with a pressure related to the load of the vehicle, which device is arranged for delivering to the valve-part a force proportional to a certain greater force and comprises a housing, an incompressible medium enclosed therein, a piston transmitting the greater force to the medium and an axially movable plunger in contact with the medium, which plunger is provided to deliver the force and having a smaller cross sectional area than the piston.

Such a weighing valve is usually mounted in the spring suspension of a railway car or another vehicle and reduces an input air pressure to an output air pressure related to the load of the vehicle. This air with reduced pressure is delivered to a device regulating the brake force in response to the force on the valve or in other words the load of the vehicle.

In known valves of this kind there is a so called differential piston, whose smaller diameter part consists of the plunger and whose larger diameter part is exposed to compressed air. The comparatively low pneumatic pressure acting on the larger diameter part of the differential piston is counterbalancing the high specific pressure acting on the smaller diameter part, i.e. the plunger.

In one known construction the medium in the device is an enclosed hydraulic fluid and in another the medium is a rubber material in the form of a disc. Apart from the severe tightness problems involved with the enclosed hydraulic fluid there are common disadvantages with the prior force transmitting devices. Firstly, owing to comparatively low working pressure in the medium and the large working area resulting thereof, the devices have made earlier weighing valves voluminous and thus difficult to build into the suspension of a vehicle. Secondly, the known weighing valves do not work satisfactorily in spite of rather complex and expensive constructions. The reason for this is that all vibrations and short-wave variations in the vehicle suspension acting on the device are transferred via the small diameter part of the differential piston to the valve causing the valve to flutter and consuming air. In an attempt to solve the problems earlier valves have been provided with damping means in the form of narrow passages, which make the valves more complex, expensive and above all unreliable.

One object of the present invention is to reduce the size of the force transmitting device and thus of the weighing valve by making possible an increased working pressure in the medium and at the same time to solve the damping problem.

This is according to the invention accomplished in that the incompressible medium is in the form of a solid block of a plastically deformable material and that the plunger is extending into the medium, so that its end on all sides is surrounded by the medium.

It is of course possible to let the medium work under the comparatively low pressure (for example 30 kp/cm$^2$) which is used in present constructions and above all to utilize the advantage with the improved damping. However, if the pressure in the medium is increased by reducing the working area of the solid block, it will not be possible to let the plunger coact with the medium in the conventional way owing to the damping problems. A weighing valve incorporating a device according to the invention has a working pressure in the order of 100 – 700 kp/cm$^2$, which means that some sealing problems have to be solved.

By the fact that the plunger end is extending into the medium all the forces from the medium acting on the cross sectional area thereof will also act on the sides of the plunger end and will dampen the vibrations and short-wave variations.

The result is, apart from that the weighing valve as a result of the high working pressure can be produced in very small sizes and to very low costs, greatly improved operational characteristics and considerably reduced air consumption.

Constructionally it is preferred to have the plunger, which has the form of a rod, extending through a bore in the piston. In this case the rather difficult sealing problems can be solved in that the sealing at the medium on one hand between the piston and the housing and on the other hand between the piston and the rod is effected by a coacting aggregate of a sealing ring with sealing lips facing the medium at the housing and the rod and a backing ring of a rigid and friction-reducing material facing the piston.

However, the rod and the piston can be completely separated in the housing, in which case the rod extends through a hole in the housing. The sealing at the medium between the rod and the housing is in this case effected by a deformable sealing ring mounted in the housing and surrounding the rod, whereas the sealing at the medium between the piston and the housing is effected by a deformable sealing ring mounted in the housing and surrounding the piston.

To avoid shearing forces on the medium and to obtain a smooth operation it is preferred that the end of the rod in the medium is rounded.

Figure 2:
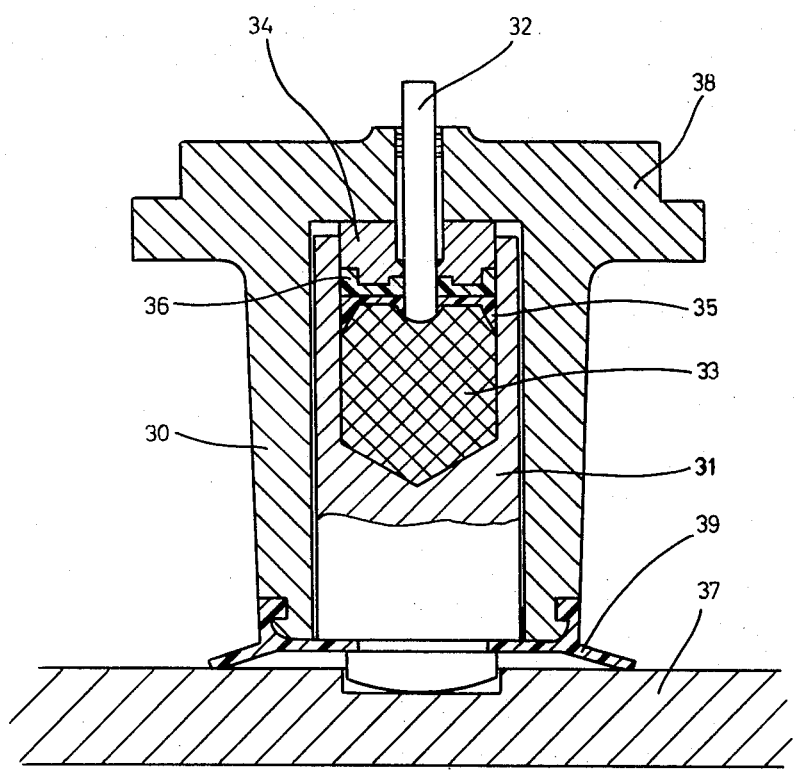

Two preferred embodiments of the invention will now be described in more detail with reference to the accompanying drawings in which FIG. 1 is an axial section through a weighing valve incorporating a device according to the invention, and FIG. 2 is an axial section through another device according to the invention without any valve.

Referring first to FIG. 1, the weighing valve comprises a housing 1 intended to be secured in a vehicle and provided with a cover 2. A flexible diaphragm 3 is marginally clamped between said housing 1 and cover 2. The housing 1 has a central bore having a larger diameter part 4 and a smaller diameter part 5. The larger diameter part 4 of the central bore is lined with a sleeve 6 of a low-friction material, for example "Delrin", receiving a piston 7. The available space within the larger diameter part 4 is filled with a medium 8 in the form of a solid block of a material which is incompressible and plastically deformable within the normal range of working temperatures of the device. Polyethylene or a silicone rubber, for example, is a suitable material.

The flexible diaphragm 3 is fastened to and supported by a differential piston 9, 10, 11. The part 9 of the piston acts together with the diaphragm 3 as a larger diameter part of the differential piston, whereas the part 10 — which can be called a plunger and is shaped as a rod or needle — acts as a smaller diameter part of the differential piston. The piston part 10 extends through the bore part 5 into the bore part 4 and protrudes into the medium 8. The piston part 11 is designed as a first valve member adapted to engage and co-operate with a second valve member 12 provided with an axial bore 13. A rubber gasket 14 clamped between the cover 2 and a separate cover part 2'' allows axial movements of the second valve member 12 and prevents air leakage. A compression spring 15 provided between the cover part 2' and the second valve member 12 urges the second valve member downwards. (For clarity's sake, there is shown a gap between the two valve members 11 and 12. The position shown does never occur under operational circumstances.) The first valve member 11 is surrounded by a valve seat 16 which is stationary in the cover 2. A small annular gap exists between the first valve member 11 and the valve seat 16.

From any suitable source compressed air may be fed through a first opening 17 in the cover 2, and air may be passed to any suitable responsive device (not shown) through a second opening 18 in the cover 2.

A deformable sealing ring 19 made of synthetic plastic material, for example polytetrafluorethylene, surrounds the protruding part of the rod 10 and bears against the shoulder surface between the two parts 4 and 5 of the central bore having different diameters. Another deformable sealing ring 20 preferably of the same material as the ring 19, surrounds the piston 7 and bears against the sleeve 6, which is retained by a ring 21 secured by a locking ring 22.

The illustrated weighing valve will operate as follows:

During normal operation of the device a force related to the load of a vehicle is transmitted as a push force acting on the piston 7, connected to a part of the suspension of the vehicle, and then through the medium 8 to the housing 1, from which the force is passed to an adjacent part of the vehicle. However, a small part of the force is transferred from the medium 8 to the piston part 10 and further upwards to the cover 2 through the larger diameter part 9 of the differential piston and the compressed air thereabove and counter-balancing said piston. The pneumatic pressure is low in comparison to the high pressure (in the order of 100 – 700 kp/cm$^2$) in the medium 8.

Now in case the vehicle load is increased the pressure within the medium 8 will increase and act on the piston part 10 to move the piston upwards, causing an upward movement of the valve member 12. Compressed air supplied through the opening 17 may pass the valve seat 16 and enter into the chamber between the diaphragm 3 and the cover 2, and the pressure in this chamber will now rise and cause a downward movement of the differential piston until the valve member 12 again contacts the valve seat 16.

The pressure of the air in the outlet opening 18 will thus correspond to the magnitude of the new force transmitted by the device and said air pressure constitutes a signal which may be transmitted in any suitable manner to any suitable responsive device or devices, for example to a brake-regulating device of a vehicle or to a gauge calibrated to indicate the load on the vehicle.

Now in case the load on the vehicle is decreased the piston part 10 will be pressed further into the medium 8 owing to the decreased pressure prevailing in said medium. This movement of the differential piston will cause a venting to the atmosphere of the chamber between the diaphragm 3 and the cover 2 through the axial bore 13 and a bore 23 in the cover part 2' and the pressure in this chamber will now decrease and permit an upward movement of the differential piston until the valve member 11 again contacts the valve member 12.

Referring now to FIG. 2, there is shown a preferred device according to the invention. In this Figure no valve is shown, it being understood that the valve shown in FIG. 1 or another suitable valve can be used together with the device. The device shown comprises a casing 30 having a central bore whose larger diameter part is adapted to receive a piston-shaped housing 31 (functionally corresponding to the housing 1 in FIG. 1) and whose smaller diameter part is adapted to receive a plunger or a rod 32, which, as already stated, can be connected to a suitable valve. The housing 31 is also provided with a central bore partly filled by a solid block of an incompressible plastically deformable medium 33, for example a temperature stable silicon rubber. The piston-shaped housing 31 of this embodiment is so termed because it encloses the medium 33 by co-operating action of the piston-housing plug 34, but it is movable in the sense of piston part 7 of FIG. 1. In this embodiment pressure is transmitted through the medium 33 by relative movement of plug 34 and piston-shaped housing 31.

The rod 32 is extending into the medium 33, and an annular piston or plug 34 is inserted in the central bore in the housing 31 above the medium 33 and around the rod 32.

To solve the difficult problem of obtaining a sealing at the medium 33 on one hand between the rod 32 and the piston 34 and on the other hand between the piston and the bore in the housing 31 there is provided an aggregate consisting of a sealing ring 35 made of a flexible material, such as "Teflon", and a backing ring 36 of a comparatively more stiff and friction reducing material, such as "Delrin" (acetal resin). The sealing ring 35 has sealing lips on the side against the medium 33 and acts together with the medium 33 to transmit forces to the rod 32, especially on its sides.

The housing 31 rests on a part 37 of a vehicle and the casing 30 is provided with a flange 38 adapted to receive the weight of another vehicle part (not shown). A gland 39 is mounted between the lower end of the casing 30 and the vehicle part 37 in order to prevent entrance of dirt and water.

The force between the vehicle parts will be transmitted via the housing 31, the medium 33, the sealing ring 35, the backing ring 36, the piston 34 and the casing 30. Part of the force will be transmitted to the rod 32.

The rod 32 in the FIG. 2 embodiment has a rounded end which is advantageous in that no shearing forces will act on the medium 33 and that the damping effect on the rod 32 of the forces acting on the sides of the rod will be smoother. The rounded end is in fact rather important as the pressure in the medium at work varies in the range about 100 – 700 kp/cm$^2$. It is essential to note that the damping effect on the rod is proportional to the pressure in the medium, i e the force on the housing and thus on the piston.

We claim:

1. A weighing system for a vehicle, said system including force transmitting means producing a loading signal to operate a valve, said valve delivering a fluid such as air at a pressure derived from the load of the vehicle, said force transmitting means being constructed to deliver a first valve actuating force proportional to a predetermined greater vehicle load force to said valve, said force transmitting means comprising in combination, a housing, a plastically deformable block of an incompressible medium confined in the housing, a piston of a first cross sectional area extending into the housing for transmitting said greater force to said medium, and a plunger rod of a second cross sectional area smaller than the first extending into said housing and embedded in said medium with side walls gripped by said medium, said rod being movable relative to said housing, and means connecting said plunger to said valve to deliver said first valve actuating force to said valve.

2. A device according to claim 1 wherein said piston has a bore, and said plunger comprises a rod extending through said bore.

3. A device according to claim 1 including a deformable sealing medium between said plunger and said housing and in contact with said block confined in said housing.

4. A device according to claim 1 including a sealing medium between said piston and said plunger comprising a coacting aggregate of a sealing ring with lips facing the medium at the housing and plunger and a backing ring of a rigid friction reducing material between the piston and said housing.

5. A device according to claim 1 wherein said housing has a bore and said plunger comprises a rod that extends through said bore.

6. A device according to claim 1 including a deformable sealing medium between said housing and said piston, surrounding said piston and in contact with said block confined in said housing.

7. A device according to claim 1 wherein the end of said plunger extending into said medium is rounded.

* * * * *